Patented Apr. 2, 1929.

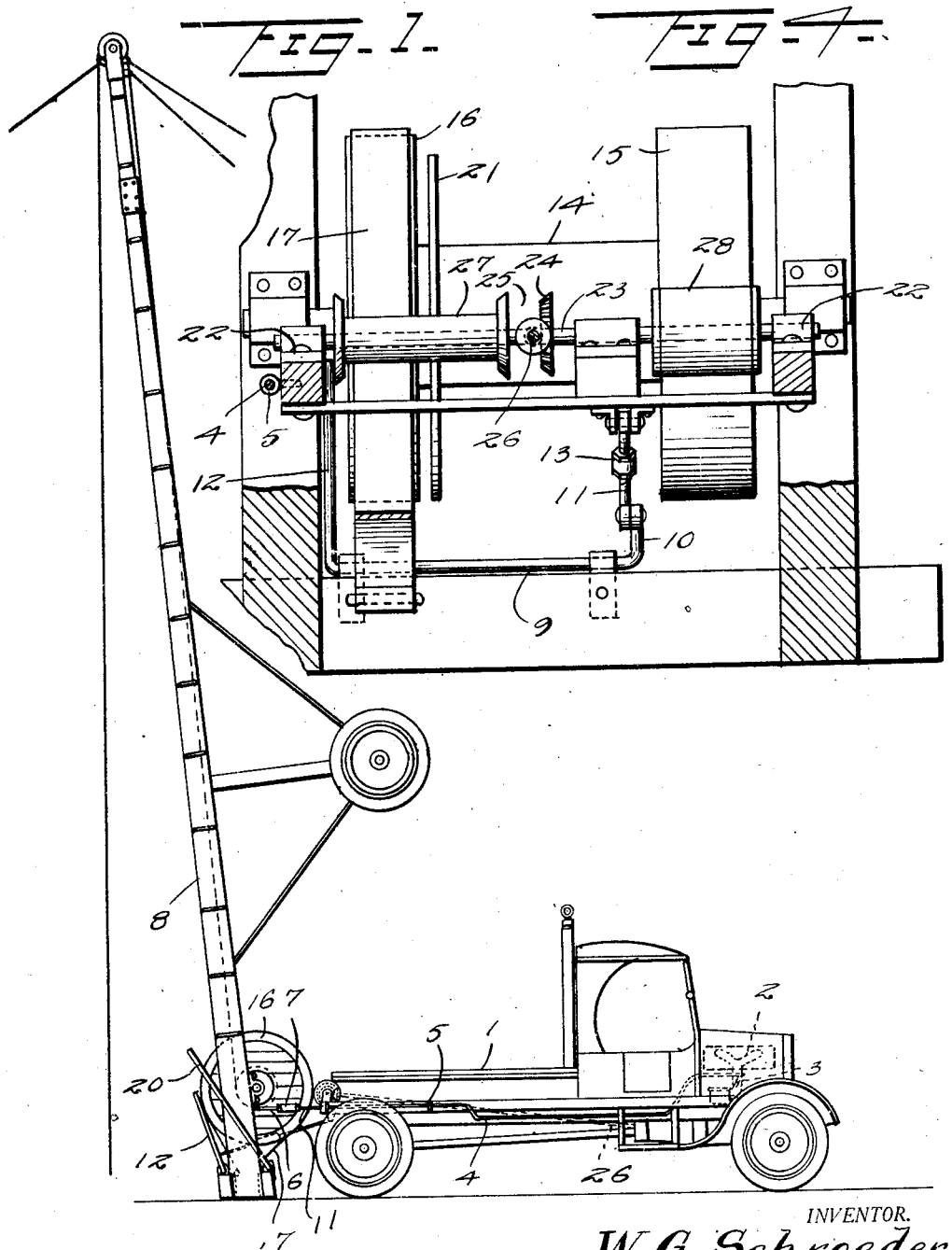

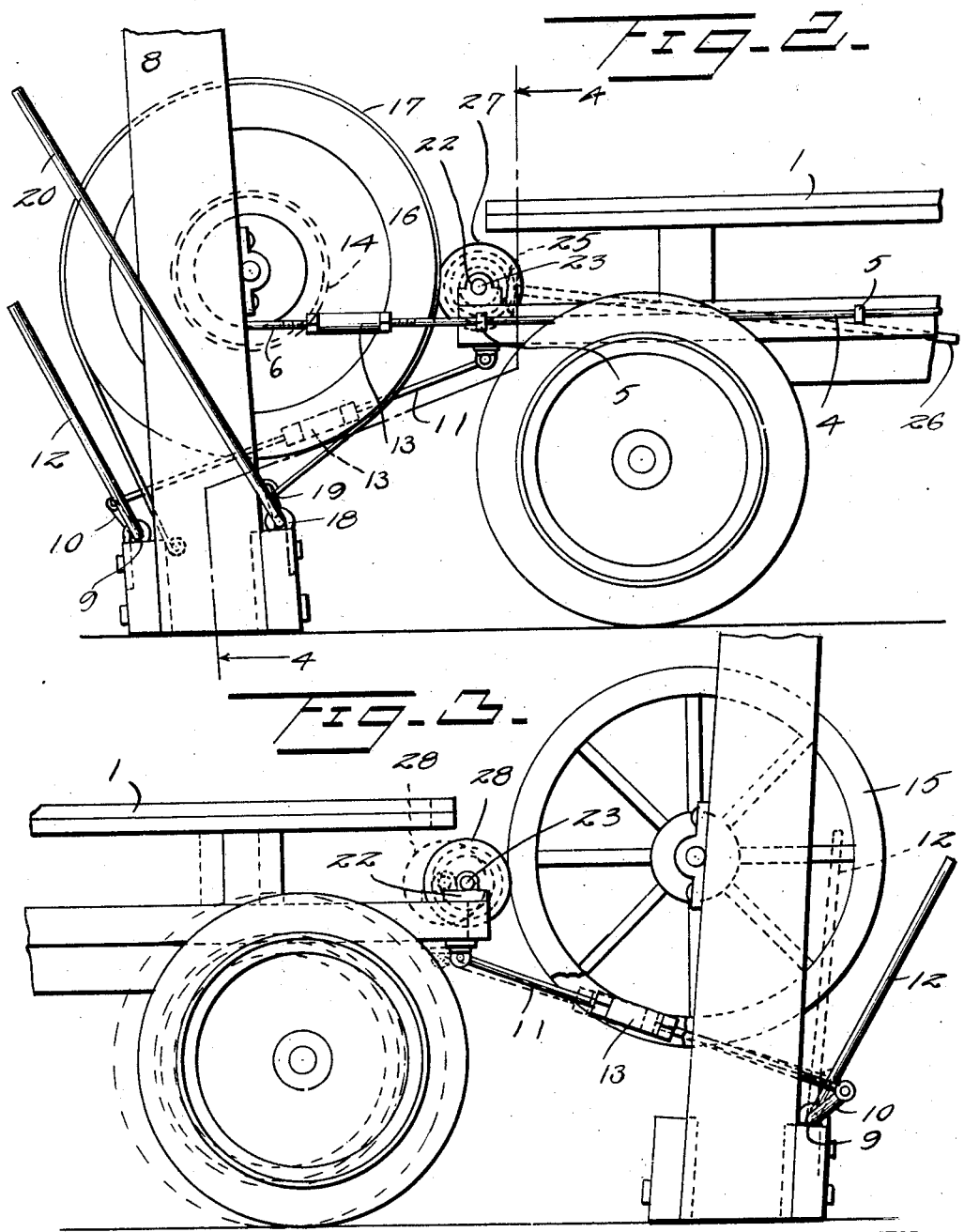

1,707,496

UNITED STATES PATENT OFFICE.

WILLIAM G. SCHROEDER, OF BARTLESVILLE, OKLAHOMA, ASSIGNOR OF ONE-HALF TO ALLEN L. McGILL, OF BARTLESVILLE, OKLAHOMA.

POWER TAKE-OFF.

Application filed September 13, 1927. Serial No. 219,312.

This invention relates to a power take-off adapted to be used for operatively transferring power from an automobile truck to the windlass of a derrick or the like and it consists in the novel features hereinafter described and claimed.

An object of the invention is to provide an apparatus of the character stated which is of simple and durable form and having its parts and features so arranged and assembled that the attendant who is working at the derrick may control or change the position of the truck with relation to the windlass of the derrick so that the transfer of power may be interrupted when desired and the engine of the truck may be automatically throttled.

In the accompanying drawings:—

Figure 1 is a side elevational view showing the truck in position with relation to a derrick and having the parts of the power take-off operatively engaging each other;

Figure 2 is an enlarged fragmentary view of the adjacent portions of the truck and the derrick looking at one side thereof;

Figure 3 is a similar view looking at the opposite side thereof;

Figure 4 is a transverse sectional view through the rear portion of the truck and the lower portion of the derrick cut on the line 4—4 of Figure 2.

As illustrated in the accompanying drawings, the truck 1 carries the usual engine 2 and the engine is provided with the usual throttle valve 3 with which a rod 4 is connected, the said rod being extended along the side of the body of the truck, passing through guides 5 and having its rear end projecting beyond the rear end of the body of the truck. A section 6 is connected with the rear end of the rod 4 by means of a sleeve or turn buckle 7 so that the said section may be adjusted longitudinally with relation to the rod by turning the sleeve or turn buckle 7. Thus the extension may be shifted to increase or decrease the length of the rod. A derrick 8 is positioned upon the ground in a usual manner and when the truck 1 is backed toward the derrick, the end of the section 6 strikes the side of the derrick whereby the rod 4 is moved longitudinally and the throttle valve 3 is opened, thus increasing the supply of gas to the engine and accelerating the operation of the engine. When the truck moves away from the derrick the rod 4 is moved rearwardly and the throttle valve 3 is closed by the return action of the spring of the said valve 3 in a usual manner. A shaft 9 is mounted for turning movement at the base of the derrick 8 and is provided at one end with a crank arm 10 which is connected by means of a rod 11 with the body of the truck 1. The shaft 9 is further provided with a handle 12. The rod 11 is made in sections which are connected together by means of a turn buckle 13. When the shaft 9 is turned by using the handle 12, the arm 10 is rocked about the axis of the shaft so that the rod 11 is moved longitudinally and thus the truck may be drawn toward the derrick or pushed therefrom.

A windlass 14 is journaled upon the derrick and is provided at one end with a friction disk 15 and at its opposite end with a friction wheel 16. A brake band 17 is secured at one end to the base of the derrick and is trained over the upper portion of the wheel 16. A shaft 18 is mounted for turning movement at the base of the derrick and is provided with an arm 19 with which the opposite end of the band 17 is connected. A handle 20 is carried by the shaft 18. By using the handle 20 and turning the shaft 18, the arm 19 may be rocked about the axis of the said shaft whereby the band 17 may be frictionally applied to the periphery of the wheel 16. Thus a band brake mechanism is provided for the windlass mechanism. The drum of the windlass is provided in the vicinity of one end with a flange 21 which is adapted to retain the hoisting cable (not shown) in proper position upon the drum of the windlass.

Bearings 22 are mounted at the rear portion of the body of the truck 1 and a shaft 23 is journaled in said bearings 22. A bevel gear wheel 24 is mounted upon the intermediate portion of the shaft 23 and its teeth mesh with the teeth of a pinion 25 mounted upon a shaft 26 journaled below the body of the truck 1. This shaft is designed to be connected to a power transmission device of any of the usual designs employed for taking power from a motor vehicle engine when the vehicle is standing. A winch drum 27 is mounted upon the shaft 23 and a friction roller 28 is mounted upon said shaft. Said roller 28 is adapted to be brought in contact with the periphery of the friction disk 15. When the shaft 23 is rotated, rotary movement is transmitted from the roller 28 to the friction disk 15 and when the roller is in contact with the disk the windlass 14 is rotated in one direction. When it is desired to release the windlass, the handle 12 is swung to shift the position of the truck so that the roller 28 will be moved out of engagement with the periphery of the disk 15. The winch is on the same shaft as the friction roller and rotates all the while the friction roller is running. The winch may be used for raising or lowering the derrick and may also be used in conjunction with the derrick for pulling the derrick out of bad places in a road or field and can be used for any other purpose, as for instance loading or unloading material or for handling pipe. The winch cannot be used while the derrick is connected with the pulling rods or the tube of a well. The device is gotten up especially to be used in the oil fields and at wells for pulling rods and tubing or pipe of any kind. The friction roller may be driven by a shaft as shown or it may be driven by using a chain and sprockets coupling the shaft with a rear wheel or axle. If driving connection is made with a drive wheel, it is, of course, obvious that the drive wheels must be raised from contact with the ground upon a support which will permit slight movement of the truck so that the friction roller 28 may be properly engaged with the periphery of the disk 15. Inasmuch as the handles 12 and 20 are located at the base of the derrick they may be manipulated by an attendant who has charge of the work being done by the derrick structure. When the truck moves away from the derrick, the throttle valve closes, so that the engine of the truck runs idle. When the truck moves toward the derrick contact of the rod extension therewith causes the throttle valve of the derrick to open whereby additional fuel is supplied to the engine and the engine will generate more power which may be used for operating the parts of the derrick structure.

From the foregoing description taken in conjunction with the accompanying drawings it will be seen that a power take-off is provided and that the apparatus may be economically used at a derrick for operating the windlass thereof.

Having described the invention what is claimed is:—

1. A motor vehicle power take-off including an engine and a control means therefor, comprising a friction roller carried by the vehicle, means for transmitting motion to the friction roller from the vehicle engine, said friction roller being positioned to contact with a rotary element mounted independently of the vehicle, and means carried by the vehicle designed to abut a fixed object upon movement of the vehicle to bring the friction roller in contact with an element to be operated thereby, for actuating said control to accelerate the engine.

2. In a structure of the character described, including a motor vehicle, an engine and a control means therefor, a friction roller carried by the vehicle, means for operating the friction roller from the vehicle engine, said friction roller being designed to be brought into frictional engagement with a rotary member, means for manually shifting the vehicle position to connect or disconnect the friction roller with the rotary member, and a motor control means comprising a shiftable bar carried by the vehicle body and projecting rearwardly thereof for engagement with a fixed structure when the friction roller is moved to working position.

3. In a structure of the character described including a motor vehicle, an engine and a control means therefor, a friction roller carried by the vehicle body at the rear thereof, means for operating the friction roller from the vehicle engine, a supporting structure, a friction wheel carried by said structure for engagement by said friction roller, means carried by the structure for coupling the same with the vehicle and for facilitating the movement of the vehicle to engage or disengage the roller with the wheel, and means carried by the vehicle designed to engage the structure when the roller and the wheel are brought into contact for accelerating the vehicle engine.

4. A structure of the character described, including a motor vehicle, an engine, and control means for the engine, a friction roller mounted upon the vehicle body, a shiftable rod carried by the vehicle body and engaging the engine control means at one end and having the other end projecting beyond the rear of the vehicle, a derrick structure, a driven element mounted upon the derrick, and manually operated means connecting the vehicle body with the derrick for moving the vehicle to bring the friction roller and driven member into contact, comprising a bar and a lever mounted on the derrick for shifting the bar longitudinally, said engine control rod being positioned to abut the derrick when the vehicle is moved to engage the friction roller with the driven member to accelerate the engine.

5. A motor truck power take-off including an engine, comprising a friction roller journalled upon the rear of the truck for engagement with a power receiving member, manually operable means attached to the truck and designed to be secured to a fixed element rearwardly of the truck to facilitate movement of the truck to bring the friction roller into engagement with the power receiving member, and an engine throttling element comprising a reciprocable bar connected at one end with the engine and having the other end positioned to abut or disengage a fixed strucuture when the manually operable means is operated.

In testimony whereof I hereunto affix my signature.

WILLIAM G. SCHROEDER.